US005731376A

United States Patent [19]

Grasmeder

[11] Patent Number: 5,731,376
[45] Date of Patent: Mar. 24, 1998

[54] SCRATCH RESISTANT POLYMER COMPOSITIONS AND ARTICLES

[75] Inventor: John Russell Grasmeder, Stockton on Tees, Great Britain

[73] Assignee: Imperial Chemical Industries PLC, London, England

[21] Appl. No.: 547,552

[22] Filed: Oct. 24, 1995

Related U.S. Application Data

[63] Continuation of Ser. No. 182,095, filed as PCT/GB92/01400, Jul. 29, 1992, abandoned.

[30] Foreign Application Priority Data

Jul. 29, 1991 [GB] United Kingdom ............ 9116356

[51] Int. Cl.$^6$ ............... C08J 5/10; C08K 3/34; C08L 23/16
[52] U.S. Cl. ............ 524/451; 524/261; 524/267; 524/449; 524/505; 524/506
[58] Field of Search ............... 524/451, 261, 524/267, 505, 506, 449; D12/192

[56] References Cited

U.S. PATENT DOCUMENTS

| | | | |
|---|---|---|---|
| 4,343,852 | 8/1982 | Isaka et al. | 428/216 |
| 4,419,411 | 12/1983 | Park | 428/516 |
| 4,613,641 | 9/1986 | Haubennestel et al. | 524/267 |
| 4,711,673 | 12/1987 | Musselman et al. | 106/287.17 |
| 4,780,505 | 10/1988 | Mashita et al. | 525/66 |
| 4,925,735 | 5/1990 | Kashizuki et al. | 428/423.1 |
| 4,937,142 | 6/1990 | Ogushi et al. | 428/391 |
| 5,085,943 | 2/1992 | Crighton et al. | 428/500 |
| 5,409,991 | 4/1995 | Mitsuno et al. | 525/66 |

OTHER PUBLICATIONS

"Handbook of Epoxy Resins" by Lee and Neville (1967) pp. 4–58 and 4–59.

Chemical Abstracts, vol. 108, No. 20, May 16, 1988, see p. 51, abstract 168682w, & JP,,62235350 (Abe et al) 1987.

Chemical Abstracts, vol. 107, No. 16, Oct. 19, 187,see p. 43,abstract 135290t, & JP,6286037 (Abe et al) 1987.

*Primary Examiner*—Vasu Jagannathan
*Assistant Examiner*—U. K. Rajguru
*Attorney, Agent, or Firm*—Cushman Darby & Cushman Intellectual Property Group of Pillsbury Madison & Sutro LLP

[57] ABSTRACT

Filled polymer compositions based on polypropylene block copolymer, particularly medium and medium to high impact grades, and a plate like filler such as talc, have improved visual scratch resistance by the inclusion of a polyorganosiloxane, particularly a polyalkylsiloxane such as polydimethylsiloxane. Silicone oils having viscosities of about 30,000 cSt are especially useful. Further benefits are obtained by the further inclusion of a fatty acid amide and/or by the use of passivated filler, particularly by the inclusion of an epoxy resin.

6 Claims, No Drawings

SCRATCH RESISTANT POLYMER COMPOSITIONS AND ARTICLES

This is a continuation of application Ser. No. 8/182,095, filed on Apr. 26, 1994, now abandoned which is a 371 of PCT/GB92/01400 filed Jul. 29, 1992.

This invention relates to scratch resistant polymer compositions and moulded articles and particularly to pigmented compositions and articles having aesthetic appeal for example vehicle interior components such as trim and facia panels.

DESCRIPTION OF RELATED ART

Plastics materials are used in many applications where aesthetic appearance is importat. Indeed, the commercial success of such articles may depend on their aesthetic appeal. In addition, such articles should also possess suitable functional properties.

To maintain a good appearance, it is desirable that plastic articles have good scratch resistance and do not optically stress whiten to any significant extent when scratched. Stress whitening of pigmented plastic articles is aesthetically undesirable because the white marks formed on scratching visually contrast with the colour of the article. This is particularly marked if the plastics article is darkly pigmented for example black, grey, brown or blue, as are commonly used in vehicle interior trim.

SUMMARY OF THE INVENTION

We have now surprisingly found that a polymer composition having a polyorganosiloxane component has excellent scratch resistance and also retains ,a desirable combination of impact strength and stiffness and may be produced economically.

Accordingly, the invention provides a polymer composition which comprises, as a major component, propylene-random ethylene-propylene block copolymer; as a minor component, a plate like inorganic filler; and a minor amount of at least 0.5% by weight of the polymer composition, of a polyorganosiloxane.

The compositions of the invention can give significantly improved resistance to stress whitening and can be used to produce moulded articles with surfaces having improved scratch resistance. Accordingly, a further aspect of the invention provides for the use of a polymer composition according to the invention as a scratch resistant material.

DESCRIPTION OF THE PREFERRED EMBODIMENTS

The block copolymer is a copolymer of propylene with a random ethylene propylene phase. As is usual in the manufacture of polyolefins using Ziegler-Natta catalysts, the term "block copolymer" indicates that, at different times during polymerisation the composition of monomer feed to the reaction is altered. As polymer chains grow and terminate relatively quickly and the system does not generate stable "live" polymer chains, the resulting polymer chains in the copolymer statistically (allowing for monomer reactivity) reflect the monomer composition of the feedstock. This yields a mixture of polymers rather than the classical [A]x-[B]y block chain structure. By changing the monomer feedstock composition gradually, an intergrade of polymer chains can be formed, this yield the so-called tapered block copolymers. In effect, the block copolymer is a blend of polypropylene and an ethylene-propylene random copolymer (or, of course, a propylene-random ethylene-propylene block copolymer having a relatively higher proportion of random copolymer), and the block copolymer can be made up by blending such polymers using conventional techniques. Generally, it is more convenient to make the block copolymer by the polymerisation route rather than by blending preformed polymers.

In the polymerisation route to the block copolymer, the ethylene monomer is introduced into the copolymer in a mixed feed with propylene. (This is also true of separately made copolymer material which is subsequently blended.) This generates random statistical ethylene-propylene copolymer (EP copolymer) chains. Typically the random copolymer part of the block copolymer contains from 40 to 60% by weight of the random copolymer ethylene units and correspondingly from 60 to 40 weight % propylene units, most usually about 50:50 ethylene to propylene units by weight. The EP copolymer typically segregates into a rubbery phase distinct from the thermoplastic, substantially isotactic, polypropylene homopolymer phase, usually during subsequent processing especially melt phase processing.

The overall proportion of ethylene units in the copolymer used in the invention is typically from 3 to 15 weight % based on total monomer, corresponding to about 5 to about 37, particularly about 6 to about 30, weight % of random ethylene-propylene copolymer in the overall block copolymer (based on the above given ethylene propylene ratios in the random copolymer component). For vehicle, especially car, interior trim applications, which often take the form of semi-structural components, the proportion is more usually 5 to 12, particularly 5 to 7 and especially about 6, weight % based on total monomer, corresponding approximately to amounts of random ethylene-propylene copolymer of about 10 to about 20, particularly about 10 to about 15 and especially about 12 weight % based on total polymer. For vehicle fascia applications, a tougher, more energy absorbing polymer is desirable so the proportion of ethylene units in the copolymer is usually rather higher than for interior trim. Typically the proportion is from about 10 to about 15, especially 11 to 13 weight % ethylene based on total monomer, corresponding approximately to about 20 to about 30, particularly about 22 to about 26, weight % based on total polymer. The remainder of the units are derived from propylene although a small proportion of other olefin monomers can be included, for example up to 10% by weight of the propylene units of $C_4$ to $C_{10}$ alpha olefin monomers. Typically, the propylene block copolymer forms at least 50% typically at least 65% and more usually at least 70% by weight of the polymer composition.

Typical propylene block copolymers used in the invention will have melt flow indexes (MFI's) of from 3, but usually at least about 5, to 80, particularly 5 to 55 (measured at 230° C. with a 2.16 kg load). Copolymers having relatively lower MFI values are particularly useful as they have good compatibility with commercially available polyorganosiloxanes. It seems that this gives particularly good resistance to scratching. For vehicle interior trim applications the MFI is desirably about 13 and for fascia applications about 6.

The "plate like filler" is a filler whose particles have a length and width substantially greater than their depth. The presence of a plate like inorganic filler in the composition of the invention gives the composition enhanced stiffness. Suitable plate like inorganic fillers include mineral fillers such as clays, mica and especially talc. Particularly useful talcs include Luzenac 15MOO and 20MOOS (Talc de Luzenac) and Finntalc MO3 from Finnminerals Oy. Although clays have plate like particles and can be used in the invention, their use alone in not especially desirable. The composition can include mixtures of plate like fillers and/or other, non plate like, fillers such as chalk, for example Polycarb SB ground chalk filler form ECC International, or milled glass fibre, for example Vetrotex 1320 unsized milled glass fibre from Vetrotex. The filler desirably has an mean particle size (measured as spheres of equal diameter) of from 1 to 20 µm. With anisotropic fillers such as the plate like filler or milled glass fibre, the maximum dimensions of individual filler particles will generally be significantly larger than the mean.

The amount of filler used is is suitably from about 15 to about 30% by weight of the composition. Usually this will be mostly or wholly of the plate like filler, but other fillers can be included as up to about half of the total filler, although this may have a deleterious effect on some properties. Usually, when non plate like fillers are included the amount will be up to about 5 weight % of the composition. For interior trim applications, the amount of filler is particularly 18 to 27, and especially about 22, % by weight of the composition. For fascia applications it is desirable to use a somewhat higher filler level, particularly with the tougher polymer desirably used, as described above, and the amount will typically be from about 22 to about 30, particularly about 24 to about 28 and especially about 26, % by weight of the composition. For interior trim applications, a particularly useful filler combination is talc 19 to 25% and chalk 1 to 3 weight % of the composition.

The polyorganosiloxane is typically a polydiorganicsiloxane especially a polydialkylsiloxane, especially one with linear alkyl groups. The polydimethylsiloxanes are particularly suitable materials. The polyorganosiloxane used in any particular case is desirably chosen to give good compatibility with the polypropylene copolymer. The main property determining compatibility appears to be the viscosity of the polyorganosiloxane. We have found that polyorganosiloxanes with viscosities of 13000 to 50000, particularly 25000 to 35000, and optimally about 30000, cSt at 25° C. are satisfactory. Such polyorganosiloxanes typically have molecular weights up to 95 kD, particularly 65 kD to 90 kD especially 80 kD to 88 kD for example 85 kD. Polyorganosiloxanes with viscosities outside the above ranges can be used but are less advantageous as they may give products with poorer properties, particularly mechanical properties. Generally compatibility is best when relatively viscous polyorganosiloxanes are used with copolymers having low MFI and relatively fluid polyorganosiloxanes are used with copolymers having high MFI. The polyorganosiloxanes can be provided to the polymer composition as the siloxane itself (usually and oily liquid) or as a masterbatch for example in polypropylene. Examples of suitable polyorganosiloxanes include Nourimix SI-702 (a 30% polyorganosiloxane masterbatch polypropylene) (Akzo) or Rhodorisil 47V/30000 (Rhone-Poulenc).

The polymer composition includes at least 0.5 weight % of polyorganosiloxane, use of less gives little benefit in improving scratch resistance. The performance of the compositions improves with increasing polyorganosiloxane amount up to about 2 weight % of the composition. Amounts larger than about 2.5 weight % offer little further benefit and it is unlikely that amounts greater that about 5 weight % will be used because of the cost of the polyorganosiloxane and such large amounts may have an adverse effect on the mechanical properties of the composition. We have obtained optimum results using from 1.5 to 2 and particularly about 1.5 weight % of polyorganosiloxane.

When the composition is fully compounded, for example by melt processing (see below) we have found that, typically and particularly when polyorganosiloxanes with viscosities within the ranges given above are used, the polyorganosiloxane is dispersed substantially homogenously throughout the polymer of the composition. In such compounded compositions, there is no visible evidence of macroscopic domains of the polyorganosiloxane and it does not visibly segregate from the polymer to aggregate at the surface. Similarly, the polyorganosiloxane does not significantly segregate from the polymer during conventional moulding e.g. injection moulding, of articles from the composition. Thus, the surface gloss of injection moulded test samples of the composition of the invention is comparable with that of otherwise similar samples but not containing the polyorganosiloxane. If the polyorganosiloxane did segregate it would tend to aggregate at the surface during moulding and give a sample having surfaces with much higher gloss. Confirmation of the homogenous distribution within and lack of segregation from the polymer is given by the tensile strength and flexural modulus properties of articles moulded from the composition of the invention. Our testing indicates that these are substantially similar to those of control articles not including the polyorganosiloxane. Similarly, we have found that the poolyorganosiloxanes do not appear to migrate within the moulded composition even at temperatures near the melting temperature of the polymer over extended periods. Typical test samples of the invention give accelerated testing results for migration to the surface (to give "bloom") which are substantially similar to those of controls not including the polyorganosiloxane.

Expected typical end uses for the compositions of the invention in moulded form include automotive interior trim and fascia components. Almost invariably these are pigmented and, thus, the polymer compositions of the invention will ordinarily be pigmented. The amount of pigment in the composition will typically be from 0.1 to about 7, most usually 0.3 to 2.5 weight % of the composition, depending on the pigment used and the colour and tone required. Suitable pigments may be organic and/or inorganic and include carbon black, titanium dioxide, iron oxide and copper phthalocyanine.

Conventional additives such as anti-oxidants, antioxidant synergists, neutralising agents, lubricants, ultra violet light stabilisers and mould release agents can be included in the composition. Examples of such additives include, as anti-oxidants hindered phenols such as Irganox 1010 (Ciba Geigy), typically in an amount of 0.05 to 0.7% especially 0.1 to 0.2%; as antioxidant thioester synergists dilaurylthiodipropionate and distearylthiodipropionate in an amount of 0.05 to 1%; as neutralising or antacid agents, materials such as aluminium magnesium hydroxy stearate, typically in an amount of 0.05 to 0.8%; as lubricants, metal, for example zinc and calcium, stearates, which my also act as antacids; and as ultra violet light stabilisers, hindered amine stabilisers such as Tinuvin 770DF (Hoechst) or Chimassorb 944 (Ciba Geigy) typically in an amount of about 0.8% (all percentages being by weight based on the composition).

Fatty acid amides are commonly used as mould release agents and can be used as such in the composition. However, we have found that the combination of polyorganosiloxane and fatty acid amide gives especially good effect on scratch resistance. The effect seems to be synergistic and we do not know why it is so beneficial. Accordingly, a further aspect of the invention provides a filled polymer composition which comprises, as a major component, propylene-random ethylene-propylene block copolymer; as a major component, a plate like inorganic filler; at least 0.5% by weight of the polymer composition of a polyorganosiloxane; and a fatty acid amide.

The effect of including a fatty acid amide component is to enhance the improvement in scratch resistance obtained by including the polyorganosiloxane. Thus, similar scratch resistance can be obtained with lower levels of the polyorganosiloxane, in combination with the acid amid, than if the polyorganosiloxane were used alone. Suitable fatty acid amides are of fatty acids with C10 to C25, especially C16 to C22, carbon chains. A particularly suitable fatty acid amide is erucamide, available as Crodamide E (Croda Chemicals). The amount of fatty acid amide will usually be up to 1 weight % of the composition, particularly 0.1 to 0.8%, and especially about 0.5% by weight of the composition. Compositions according to the invention including a fatty acid amide do not appear to have improved mould release as compared with compositions which contain fatty a acid amide but not a polyorganosiloxane. This is further evidence that the polyorganosiloxane does not have a significant beneficial effect on mould release and confirms that the polyorganosiloxanes used in the invention, particularly those within the above stated viscosity ranges, are substantially non-migratory.

The plate like inorganic filler may tend to absorb certain components in the polymer composition on forming the composition. In particular talc tends to abstract antioxidants from the polymer composition thus requiring an increased amount of antioxidant to be used. In this invention, we have additionally found that the plate like filler can absorb the polyorganosiloxane. To counteract these effects, it is generally desirable to use a plate like filler that has been passivated. Various ways of passivating fillers have been suggested, but we have found it particularly useful to passivate the filler by the inclusion of an epoxy resin. The use of epoxy resins can reduce both of these effects very considerably. The use of passivated plate like fillers forms a particular aspect of the invention, especially when the filler is passivated by the inclusion of an epoxy resin. Thus, in a further aspect the invention provides a filled polymer composition which comprises, as a major component, propylene-random ethylene-propylene block copolymer; as a major component, a plate like inorganic filler; at least 0.5% by weight of the polymer composition of a polyorganosiloxane; and an epoxy resin. Desirably the composition also includes a fatty acid amide as described above and, accordingly, the invention further includes a filled polymer composition which comprises, as a major component, propylene-random ethylene-propylene block copolymer; as a major component, a plate like inorganic filler; at least 0.5% by weight of the polymer composition of a polyorganosiloxane; a fatty acid amide and an epoxy resin.

When used, the epoxy resin is typically present in the polymer composition in an amount of from 0.1 to 2% by weight. Larger amounts do not provide any further improvement in the properties of the polymer composition. Most desirably the epoxy resin is present in an amount of 0.1 to 1.5 weight % and optimally about 0.4 to 1 weight %.

Suitably, the components of a polymer composition according to the invention, if present in the composition, are present in the following amounts by weight of the total composition; the block copolymer is present in the composition in an amount of 60 to 85, particularly 65 and desirably 70 to 80% by weight; the filler, including the plate like inorganic filler, is suitably present in an amount of 15 to 30, particularly 18 to 27 weight %; the polyorganosiloxane is suitably present in an amount of at least 0.5% and no more than 5%, preferably not exceeding 2.5% and especially not exceeding about 2% by weight; the fatty acid amide is suitably present in an amount of up to about 1%, preferably 0.1 to 0.8% especially about 0.5%; the epoxy resin is suitably present in an amount of 0.1 to 1.5% and optimally about 0.4 to 1%; any other additional components may be present in the amounts as disclosed herein.

Particular ranges of composition for compositions intended for vehicle interior trim applications are:
block copolymer: 70 to 80, particularly 73 to 78% by weight and especially of a polymer having a rubber content of 10 to 15, particularly about 12 weight % and a MFI of about 13;
filler: 18 to 27 and particularly 18 to 23, especially 20 to 22 weight %;
silicone oil: 0.5% to 2.5% and especially not exceeding about 2% and particularly about 1.5 weight %, especially of a silicone oil having a viscosity of about 30000 cSt;
fatty acid amide: 0.1 to 0.8% particularly about 0.5%;
epoxy resin: 0.1 to 1%.
other additional components may be present particularly in the amounts as disclosed above.

Particular ranges of composition for compositions intended for vehicle fascia applications are:
block copolymer: 65 to 75, particularly 68 to 73% by weight and especially of a polymer having a rubber content of 20 to 30, particularly about 22 to 26 weight % and a MFI of about 6;
filler: 18 to 27 and particularly 22 to 27 weight %;
silicone oil: 0.5% to 2.5% and especially 1.5 to 2%, especially of a silicone oil having a viscosity of about 30000 cSt;
fatty acid amide: 0.1 to 0.8% particularly about 0.5%;
epoxy resin: 0.1 to 1.5% and particularly 0.4 to 1%.
other additional components may be present particularly in the mounts as disclosed above.

The compositions of the invention can be made by mixing the components of the composition. Initial formulation can be in a 'dry' mixer, usually with the polyorganosiloxane being added as the last component, but full compounding will Usually include melt phase processing typically under high shear as in a twin screw extruder. Thus, the invention includes a method of making a composition of the invention by mixing the components of the composition in the melt phase, particularly in a twin screw extruder, and extruding the composition.

When an epoxy resin is included in the composition, we have found that the best results are obtained from the inclusion of an epoxy resin if it is incorporated into the composition in effect so as to pro-treat the plate like filler prior to the addition of the components that might be absorbed by or on the filler such as the polyorganosiloxane and antioxidant (if used). This will usually be done in the initial formulation of the mix prior to melt phase mix treatment. Accordingly, the invention additionally provides a method of producing a filled polymer composition comprising, as a major component, propylene-random ethylene-propylene block copolymer; as a major component, a plate like inorganic filler; at least 0.5% by weight of the polymer composition of a polyorganosiloxane; and an epoxy resin, which method comprises admixing the plate like filler and the epoxy resin prior to mixing with another component of the composition which is significantly absorbed by the plate like filler, in particular the polyorganosiloxane and if used an antioxidant and subsequently mixing the components of the composition in the melt phase, particularly in a twin screw extruder, and extruding the composition.

An especially convenient and advantageous way of including the polyorganosiloxane in the composition in practice is to formulate the composition not including the polyorganosiloxane up to and including part of melt phase processing, particularly in a twin screw extruder or similar high shear melt phase processor, and to add the polyorganosiloxane to the composition during such melt phase processing, for example by adding it through a port in the barrel of the extruder, and subsequently continuing melt phase processing to thoroughly mix the polyorganosiloxane into the formulation.

The polymer composition of the invention can conveniently be formed into articles such as vehicle interior trim components by injection moulding. Other production techniques can be used as appropriate. The invention includes moulded and fabricated components made from the polymer composition of the invention.

The invention is illustrated by the following examples. All parts and percentages, are by weight based on the total composition unless otherwise indicated.

Materials

Polymers

Polypropylene block copolymer—unless otherwise specified this is a 'medium impact' block copolymer of propylene containing about 6% by weight ethylene, giving an EP rubber content of about 12%, by weight of the copolymer. The copolymers used have MFI values of 6, 13 or 43 (measured at 230° C. with a 2.16 kg load). NB Example 5 uses a blend of copolymers as described in the Example.

Fillers

Luzenac 15 MOO (mean particle size ca 6 µm) Luzenac 20 MOOS (mean particle size ca 8 µm)—are high quality talcs from Talc de Luzenac.

Finntalc MO3 (mean particle size ca 2 µm) Finntalc M40 (mean particle size ca 15 µm)—are high quality talcs from Finnminerals Oy.

Polycarb SB—is ground chalk filler form ECC International.

Vetrotex 1320—is unsized milled glass fibre from Vetrotex.

Polyorganosiloxanes

PDMS(O)—is Rhodorsil 47V/30000 form Rhone Poulenc—a polydimethylsiloxane having a viscosity of 30000 cSt (±10%) and an average molecular weight of 85 kD which was added as an oil.

PDMS(M)—is Nourymix SI-702 from Akzo—a polydimethylsiloxane as a masterbatch containing 30% polydimethylsiloxane in polypropylene homopolymer.

Additives

Irganox 1010—is a hindered phenol antioxidant from Ciba Geigy.

Tinuvin 770—is a hindered amine light stabiliser from Hoechst.

Chimassorb 944—is a hindered-amine light stabiliser from Ciba Geigy.

DSTDP—distearylthiodipropionate, a thioester antioxidant synergist.

DHT4A—aluminium magnesium hydroxycarbonate an antacid.

Crodamide E—is erucamide fatty acid amide from Croda Chemicals.

Araldite—is liquid epoxy resin from Ciba Geigy.

Pigment—is a light grey mixture of carbon black and titanium dioxide for the compositions of Examples 1, 4 and 5 and, for the compositions of Examples 3, a brownish grey mixture of, firstly the pigment for Examples 1 and 2 and other tinting pigments.

Test methods

Scratch resistance (SR)—moulded test plaques of the polymer compositions were tested for scratch resistance using a hand operated scratch tester (No 706 from Sheen Instruments Ltd. of Teddington, England). Scratches were made using weights of 100 g, 250 g, 500 g, 750 g and 1000 g to a 0.5 mm hemispherical stylus which was drain over the surface. The scratches were visually assessed by four independent observers and the test plaques ranked according to the visibility of the scratches (1 indicating a least visible scratches). The rankings of the four observers were aggregated to give an overall ranking score and order. In Example 4 the mean ranking score of 4 observers (rounded to 1 decimal figure) is given. (This test is based on BS3900-E2).

Component Bloom—moulded test plaques of the polymer compositions were tested for component bloom by placing the plaques in an oven at a temperature of 150° C. for a period of 1000 hours. During the 1000 hour period the plaques were visually inspected every 2 days and also after the 1000 hour period.

Specular gloss (Gloss)—was measured at 60° of the smooth side of moulded test plaques according to ASTM D523-85 both before placement of the plaques into the oven and after the 1000 hour test period (a large change in surface gloss being indicative of component bloom). In Example 4 the figure given is the reduction in specular gloss (after about 750 hours ageing at 150° C.) expressed as a percentage of the starting value.

Tensile yield stress (TYS-MPa)—was measured according to ISO 527, with a rate of application of force of 50 mm/min.

Flexural Modulus (FM-GPa)—was measured according to ISO 178, with a rate of application of force of 10 mm/min.

Notched Izod (Izod-kJm$^{-2}$)—was measured according to ISO 180 at 23° C. and sometimes also at 110° C. with notch radius of 0.25 mm.

Instrumented dropped weightimpact strength (IDWIS-J) —was measured according to BS 2782:306B at 23° C. with a 3 mm thick sample.

Heat Distortion Temperature (HDT) at 1.8 Mpa (°C.)— was measured according ISO 75A.

Heat Distortion Temperature (HDT) at 0.45 Mpa (°C.)— was measured according to ISO 75B.

EXAMPLE 1

A series of compositions (1(i) to 1(ix)) according to the invention were prepared. Each composition included:

| | |
|---|---|
| Luzenac 15 MOO | 22%, |
| PDMS(O) (compositions li) to lviii)) | see Table 1 |
| PDMS(M) (composition lix)) | see Table 1 |
| Crodamide E | see Table 1 | and an additive mix of:

| | |
|---|---|
| Irganox 1010 | 0.16% |
| Tinuvin 720DF | 0.2% |
| DCTDP | 0.4% |
| DHT4A | 0.1% |
| Pigment | 0.3% |
| Araldite | 0.5% | the balance of the composition being polypropylene block copolymer having a melt flow index (MFI) of 113 (230C/2.16kg).

A control sample omitting the polyorganosiloxane was also made up.

The compositions were prepared by mixing the polypropylene block copolymer, Luzenac 15 MOO and additive mix for 2 minutes in a Henschel high speed mixer. In preparing composition 1(ix), the masterbatch polydimethylsiloxane PDMS(M) was also mixed with the dry mixture. For all compositions except 1(ii) the epoxy resin was then added and the mixture was mixed for a further 30 seconds. The polydimethylsiloxane (as oil) PDMS(O) was then added and the whole was mixed for a further minute (compositions 1(i) to 1(viii) only). For composition 1(ii), the polydimethylsiloxane oil was added to the dry mixture and mixed for about 30 seconds after which the epoxy resin was added and the whole was mixed for a further 2 minutes.

The compositions (1C and 1(i) to 1(ix) were melt processed in a twin screw extruder to produce lace which was cut into granules. The granules were injection moulded into sample testing plaques (4-texture grained Europlaques) and tested for scratch resistance as described above. The results of the testing are set out in Table 2 below. In Table 2 the plaques retain the identifying letters of the compositions from which they were made.

The test results clearly indicate that the inclusion of the polyorganosiloxane (polydimethylsiloxane) in the compositions gave moulded plaques having superior scratch resistance as compared to the controls which did not include the polyorganosiloxane. The additional benefit of combining the polyorganosiloxane with a fatty acid amide is shown by the results for compositions 1(vi) and 1(vii). A comparison of the results for compositions 1(i) and 1(ii) indicate that significant improvements in scratch resistance may be secured by incorporating an epoxy resin into the composition prior to addition of the polyorganosiloxane.

EXAMPLE 2

Compositions (2(i) and 2(ii)) according to the invention were prepared according to the procedure of Example 1. Each composition included:

| | | |
|---|---|---|
| Luzenac 15 MOO | 22% | |
| PDMS(O) | see Table 1 | |
| Crodamide E | see Table 1 | | and the additive mix listed in Example 1, with the balance of the composition being polypropylene block copolymer having a melt flow index (MFI) of 43 (230C/2.16kg). The PDMS(O) was added to the mixture after addition of the epoxy resin.

A control sample (2C) omitting the polyorganosiloxane was also made up.

Samples 2C, 2(i) and 2(ii) were melt processed and tested according to the procedure of Example 1, the results of which are set out in Table 2.

EXAMPLE 3

A composition (3) according to the invention was prepared according to the procedure of Example 1 including:

| | | |
|---|---|---|
| Luzenac 15 MOO | 22% | |
| PDMS(M) | see Table 1 | |
| Crodamide E | see Table 1 | | and the additive mix listed in Example 1, with the balance of the composition being polypropylene block copolymer having a melt flow index (MFI) of 6 (230C/2.16 kg). The PDMS(M) was added to the dry mixture.

A control sample (3C) omitting the polyorganosiloxane was also made up.

Samples 2C and 3 were melt processed according to the procedure of Example 1 to produce Europlaques and tested for component bloom, specular gloss, tensile yield stress, flexural modulus, notched izod, IDWIS and heat distortion temperature as described above. The results of the testing are set out in Table 3.

As regards component bloom, visual inspection of the plaques during and after the 1000 hour test period indicated that no visible component bloom had occurred. The specular gloss results in Table 3 demonstrate that the addition of polydimethylsiloxane to the composition did not lead to any significant comonent bloom during the test period, the change in gloss for both samples being approximately the same.

The other physical property data in Table 3 demonstrate that polymer compositions having polyorganosiloxane have comparable physical propertieds to a similar polymer composition not having the polyorganosiloxane.

Composition 3 has greater gloss than composition 3C and the comparable HDT, stiffness and toughness data provide evidence that the dispersion of the polydimethylsiloxane in the polymer composition is substantially homogenous.

EXAMPLE 4

A series of compositions was made up and tested, based on a formulation for car interior trim applications as follows:

| Material | % by wt |
|---|---|
| Copolymer (MFI 13) | 73.94 |
| Luzenac 20 MOOS | 22 |
| PDMSO | 1.5 |
| Pigment | 0.7 |
| Additives | |
| Irganox 1010 | 0.1 |
| DSTDP | 0.1 |
| Tinuvin 770 | 0.5 |
| Crodamide E | 0.5 |
| Zinc stearate | 0.16 |
| Araldite | 0.5 |

The compositions were made up by dry blending all the components apart from the polyorganosiloxane then adding the polyorganosiloxane and subsequently melt processing the mix in a twin screw extruder to make a lace that was cut up into pellets.

A variety of compositions were made up based on the above formulation and the variations in the compositions are summarised in Table 4 below. In the various compositions the following points should be noted. For control formulations i.e. containing no polyorganosiloxane the formulation used was as set out above, but substituting copolymer for the siloxane. In Part A, samples 4Ai to 4Aix and 4AC (Control) the nature (viscosity) and proprortion of the polyorganosiloxane (polydimethylsiloxane) was varied. Increased proportions of siloxane were obtained by adding further siloxane and correspondingly reducing the amount of copolymer to give the desired percentage on the overall composition. Compositions having lower proportions were made up by blending corresponding amounts of the high silicone and control formulations. In Part B, samples 4Bi to 4Bv and 4BC (Control) the amount and nature of the filler was varied. Changes in the filler level were made by substituting filler for the polymer or providing further polymer for the reduced level of filler appropriately.

In Part C, samples 4Ci to 4Civ, polydiphenyldimethylsiloxane was substituted for the polydimethylsiloxane used in the base formulation and the amount was varied as described above. In Part D, samples 4Di, 4Dii and 4DC (control) the increased level of erucamide was obtained by adding sufficient further amide to acheive the enhanced level.

The results of testing for mechanical properties and gloss and scratch testing (4 observer ranking of samples from parts A to D) between the various samples are given in Table 5 below. These results indicate that dimethylsiloxane is particulalry effective in reducing the visual impact of scratching, that silicone levels of about 1.5% (particularly of dimethylsiloxane) are effective without giving rise to significant loss of mechanical properties and that silicones with viscosities of about 30000 cSt are especially beneficial.

Some samples were subjected to accelerated heat ageing at 150° C. until the samples became embrittled i.e. the samples cracked or broke under gentle (manual) flexing. The tests indicated that the use of silicones in amounts in the range 0.5 to about 2.5% by weight increased the time to failure modestly, typically by about 2 to 10% above the approx 820 hours of the control (no silicone). As the test does not give particularly precise data the specific numbers are not included. In the samples with differing levels of talc filler, there was no significant change in heat ageing time. This indicates that the epoxy resin is acting effectively to passivate the talc filler. The sample using 50:50 talc:chalk filler had a slightly lower time to failure than the equivalent talc filler only sample possibly indicating that a somewhat higher level of epoxy resin would be beneficial to ensure that all the filler surface was passivated.

The control 4AC and basic 4Aii samples were further tested for paint adhesion. Injection moulded plaques were coated with a chlorinated polyolefin primer and then painted with a vehicle bumper grade paint. The peel strength of the paint was measured in a 180 degree peel test at 50 mm·min$^{-1}$. Both samples gave peel force results of more than 1 kg(force)·cm$^{-1}$ both parallel and perpedicular to the direction of moulding with the plaques of the composition of the invention giving slightly higher values.

EXAMPLE 5

A formulation for car front panel 'fascia' applications was made up as set out below.

The copolymer used was a blend of 3 grades of polypropylene copolymer:

44.89 parts of a 'medium impact' block copolymer having an EP rubber (random EP copolymer) content of about 12% by weight and a MFI of 13;

12.83 parts of a 'high impact' block copolymer having an EP rubber (random EP copolymer) content of about 18% by weight and a MFI of 1.5; and 11.50 parts of a masterbatch of an ethylene-propylene rubber in polypropylene containing about 66% by weight EP rubber and having a MFI of 0.6.

This blend had an overall rubber content of 21.5% by weight (corresponding to an ethylene content of about 11% by weight) and a MFI of about 6.

| Material | % by wt |
| --- | --- |
| Copolymer Blend | 69.22 |
| Luzenac 20 MOOS | 10 |
| Finntalc M03 | 16 |
| PDMSO | 2.0 |
| Pigment | 0.7 |
| Additives | |
| Irganox 1010 | 0.2 |
| Tinuvin 770 | 0.35 |
| Chimmasorb 944 | 0.35 |
| Crodamide E | 0.5 |
| Zinc steatate | 0.18 |
| Araldite | 0.5 |

The formulation was made up as generally described in Example 4 and testing showed that the mechanical and other physical properties of this formulation were not significantly different from those of the control—see Table 6 below. Scratch resistance was distinctly superior to that of the control and was approximately as good as for Sample 4Aii in Example 4.

Heat aging testing as described in Example 4 indicated that the formulations including silicone had time to failure at least as good, as those of the control.

EXAMPLE 6

A series of compositions was made up and tested, based on a formulation for car interior trim applications as set out below.

| Material | % by wt |
| --- | --- |
| Copolymer (MFI 13) | 76.07 |
| Luzenac 20 MOOS | 10 |
| Vetrotex 1320 | 10 |
| PDMSO | 1.5 |
| Pigment | 0.67 |
| Additives | |
| Irganox 1010 | 0.1 |
| DSTDP | 0.1 |
| Tinuvin 770 | 0.2 |
| Chimmasorb 944 | 0.2 |
| Crodamide E | 0.5 |
| Zinc stearate | 0.16 |
| Araldite | 0.5 |

This formulation is designated 6i.

Other similar formulations were made up:

6Ci—control using all talc filler (as 6ii) and no silicone (replaced with polymer);

6Cii—control with no silicone;

6ii—as 6i but with 10% Luzenac 20 MOOS replacing the Vetrotex 1320; and

6iii—as 6i but using Finntalc M40.

The physical properties of these formualtions showed that the glass filled formulations had relatively poor impact resistance, particularly below ambient temperature but had relatively high stiffness and tensile strength. The formulation using the coarse talc also had relatively poor impact resistance.

Scratch testing of these samples gave the following results:

| Sample No | Ranking score | Average rank |
| --- | --- | --- |
| 6Ci | 16 | 4.0 |
| 6Cii | 7 | 1.75 |

| Sample No | Ranking score | Average rank |
| --- | --- | --- |
| 6i | 2 | 0.5 |
| 6ii | 4 | 1.0 |
| 6iii | 5 | 1.25 |

These results show that even though the use of a mixture of talc and milled glass as a filler improves the scratch resistance score, although at the cost of poorer impact performance, the inclusion of a silicone oil gives still better results even when a relatively coarse talc filler is used.

TABLE 1

| Compn. | PDMS | CRODAMIDE E | OTHER |
| --- | --- | --- | --- |
| 1CA (comp.) | | | |
| 1(i) | 2% | | |
| 1(ii) | 2% | | |
| 1(iii) | 2% | | 1% epoxy resin |
| 1(iv) | 1% | | |
| 1(v) | 1.5% | | |
| 1(vi) | 1% | 0.5% | |
| 1(vii) | 1.5% | 0.5% | |
| 1(viii) | 2% | | 0.5% epoxy resin |
| 1(ix) | 7% of masterbatch (2.1% PDMS) | | |
| 2C(comp.) | | | |
| 2(i) | 2% | | |
| 2(ii) | 1% | 0.5% | |
| 3C | | | |
| 3 | 7% of masterbatch (2.1% PDMS) | | |

TABLE 2

| Compn. | Observer 1 | 2 | 3 | 4 | Sum 1 to 4 | Overall Ranking |
| --- | --- | --- | --- | --- | --- | --- |
| 1C(comp) | 13 | 13 | 13 | 12 | 51 | 12 |
| 1(i) | 1 | 3 | 1 | 3 | 8 | 1 |
| 1(ii) | 6 | 6 | 5 | 7 | 24 | 7 |
| 1(iii) | 3 | 1 | 1 | 6 | 11 | 3 |
| 1(iv) | 9 | 9 | 13 | 9 | 40 | 9 |
| 1(v) | 6 | 10 | 13 | 11 | 40 | 9 |
| 1(vi) | 3 | 5 | 5 | 2 | 15 | 5 |
| 1(vii) | 1 | 2 | 1 | 4 | 8 | 1 |
| 1(viii) | 11 | 10 | 13 | 10 | 44 | 11 |
| 1(ix) | 6 | 6 | 5 | 1 | 18 | 6 |
| 2(comp) | 13 | 13 | 13 | 13 | 52 | 13 |
| 2(i) | 3 | 3 | 1 | 5 | 12 | 4 |
| 2(ii) | 9 | 8 | 5 | 8 | 30 | 8 |

TABLE 3

| | Composition 3C | Composition 3 |
| --- | --- | --- |
| Specular gloss: | | |
| i) Initial | 17.4 | 22.3 |
| ii) After Heating | 14.6 | 20.7 |
| iii) % change | −16 | −13 |
| Tensile yield stress (MPa) | 28.3 | 24.2 |
| Flexural Modulus (GPa) | 2.2 | 2.1 |
| Notched Izod (kjm$^{-2}$) | 4.3 | 4.7 |
| IDWIS (J) | 20 B/D | 31 D/B |
| HDT (°C.) (1.8 MPa) | 69 | 66 |
| HDT (°C.) (0.45 MPa) | 128 | 128 |

TABLE 4

Example 4 Part A - varying the amount and viscosity of the silicone oil

| Run No | Silicone Oil Amount (wt %) | viscosity (cSt) |
| --- | --- | --- |
| 4Ai | 0.5 | 30000 |
| 4Aii | 1.5 | 30000 |
| 4Aiii | 5.0 | 30000 |
| 4Aiv | 0.5 | 60000 |
| 4Av | 1.5 | 60000 |
| 4Avi | 2.5 | 60000 |
| 4Avii | 0.5 | 12500 |
| 4Aviii | 1.5 | 12500 |
| 4Aix | 2.5 | 12500 |
| 4Ax | 5.0 | 12500 |
| 4AC (Control) | 0 | — |

Example 4 Part B - varying the amount and nature of the filler

| Run No | silicone oil (wt %) | amount (wt %) talc | chalk | |
| --- | --- | --- | --- | --- |
| 4Bi | 1.5 | 15 | 0 | |
| 4Bii | 1.5 | 22 | 0 | (same as Aii) |
| 4Biii | 1.5 | 30 | 0 | |
| 4Biv | 1.5 | 16.5 | 5.5 | |
| 4Bv | 1.5 | 11 | 11 | |
| 4BC (Control) | 0 | 22 | 0 | (same as 4AC) |

Example 4 Part C - varying the chemical nature of the silicone oil

| Run No | silicone oil (wt %) |
| --- | --- |
| 4Ci | 0.5 |
| 4Cii | 1.5 |
| 4Ciii | 2.5 |
| 4Civ | 5.0 |

Example 4 Part D - varying the amount of fatty acid amide

| Run No | Crodamide E (wt %) | |
| --- | --- | --- |
| 4D (Control) | 0.0 | (same as 4AC) |
| 4Di | 0.5 | (same as Aii) |
| 4Dii | 0.8 | |

TABLE 5

| Run No | Izod (kJ · m⁻²) 23° C. | 10° C. | FM (GPa) | TYS (MPa) | HDT (°C.) 1.8 MPa | 0.45 MPa | Gloss | SR (mean) |
|---|---|---|---|---|---|---|---|---|
| Part A | | | | | | | | |
| 4Ai | | | | | | | 13 | 10.6 |
| 4Aii | 3.9 | 3.2 | 2.7 | 23.5 | 62 | 111 | 14 | 5.3 |
| 4Aiii | | | | | | | 31 | 1.0 |
| 4Aiv | | | | | | | | 18.1 |
| 4Av | 3.4 | 2.6 | 2.8 | 23.1 | 61 | 109 | | 6.3 |
| 4Avi | 4.1 | 3.3 | 2.6 | 22.1 | 60 | 111 | 26 | 5.3 |
| 4Avii | 2.6 | 2.0 | 2.9 | 24.8 | 62 | 116 | | 10.3 |
| 4Aviii | 2.9 | 2.2 | 2.9 | 23.3 | 64 | 114 | | 5.5 |
| 4Aix | 3.1 | 2.4 | 2.9 | 22.3 | 60 | 110 | | 1.3 |
| 4Ax | 4.8 | 3.4 | 2.5 | 20.6 | 61 | 109 | 26 | 10.3 |
| 4AC | 4.0 | 3.5 | 2.5 | 26.0 | 60 | 115 | 13 | 17.8 |
| Part B | | | | | | | | |
| 4Bi | 4.9 | 3.5 | 2.3 | 23.6 | 58 | 105 | | 3.0 |
| 4Bii | 3.9 | 3.2 | 2.7 | 23.5 | 62 | 111 | | 5.3 |
| 4Biii | 3.8 | 2.9 | 2.9 | 22.5 | 63 | 114 | | 12.4 |
| 4Biv | 5.0 | 3.6 | 2.5 | 22.2 | 60 | 106 | | 13.0 |
| 4Bv | 5.4 | 3.8 | 2.2 | 21.4 | 58 | 98 | | 10.3 |
| 4BC | 4.0 | 3.5 | 2.5 | 26.0 | 60 | 115 | | 17.8 |
| Part C | | | | | | | | |
| 4Ci | | | | | | | | 15.3 |
| 4Cii | 3.0 | 1.8 | 2.8 | 23.7 | 61 | 110 | | 14.1 |
| 4Ciii | 3.3 | 2.7 | 2.8 | 22.8 | 61 | 113 | | 16.4 |
| 4Civ | 4.6 | 3.5 | 2.5 | 21.5 | 58 | 107 | | 15.9 |
| Part D | | | | | | | | |
| 4DC | 4.0 | 3.5 | 2.5 | 26.0 | 60 | 115 | | 17.8 |
| 4Di | 3.9 | 3.2 | 2.7 | 23.5 | 62 | 111 | | 5.3 |
| 4Dii | 4.3 | 3.3 | 2.6 | 22.5 | 61 | 108 | | 7.8 |

TABLE 6

| Sample No | Izod (kJ · m⁻²) 23° C. | 10° C. | −40° C. | FM (GPa) | TYS (MPa) | HDT (°C.) 1.8 MPa | 0.45 MPa |
|---|---|---|---|---|---|---|---|
| 5C | 16 | 6.3 | 3.5 | 2.5 | 23 | 62 | 109 |
| 5 | 25 | 10 | 4.3 | 2.4 | 20 | 58 | 103 |

I claim:

1. A polymer composition which comprises, as a major component, propylene-random ethylene-propylene block copolymer; as a minor component, from about 15 to about 30% by weight of the composition of an inorganic plate shaped filler coated with from 0.4 to 1% by weight of the composition of an epoxy resin to passivate the filler and minimize absorption of polyorganosiloxane by the filler; and from 0.5% by weight to 2.5% by weight of the polymer composition of a polyorganosiloxane.

2. A composition as claimed in claim 1 wherein the random ethylene-propylene component of the block copolymer comprises from 40 to 60% by weight of the random copolymer ethylene units and correspondingly from 60 to 40 weight percent propylene units, each weight percent being based on monomers of the random ethylene-propylene copolymer part of the block copolymer.

3. A composition as claimed in claim 1 wherein the ethylene content of the block copolymer is from 3 to 15 weight percent based on the total monomer of the propylene-random ethylene-propylene block copolymer.

4. A composition as claimed in claim 1 wherein the polyorganosiloxane is a polydimethylsiloxane.

5. A method of making a polymer composition which method comprises forming a mixture comprising as a major component, propylene-random ethylene-propylene block copolymer; as a minor component, from about 15 to about 30% of the composition of an inorganic plate shaped filler coated with from 0.4 to 1% by weight of the composition of an resin; and from 0.5% by weight to 2.5% by weight of the polymer composition of a polyorganosiloxane, subjecting the mixture to high shear melt processing, extruding the composition as a lace and solidifying and cutting the lace to produce pellets of the composition in which method the epoxy resin is mixed with components of the composition including the inorganic plate shaped filler before being mixed with polyorganosiloxane.

6. A composition as claimed in claim 1 wherein the inorganic plate shaped filler is talc.

* * * * *